United States Patent
Szymandera

(10) Patent No.: US 9,376,202 B2
(45) Date of Patent: Jun. 28, 2016

(54) PITCH CONTROL OF CONTRA-ROTATING AIRFOIL BLADES

(75) Inventor: Aleksander Krzysztof Szymandera, Warsaw (PL)

(73) Assignee: GE AVIATION SYSTEMS LIMITED, Cheltenham (GB)

(*) Notice: Subject to any disclaimer, the term of this patent is extended or adjusted under 35 U.S.C. 154(b) by 891 days.

(21) Appl. No.: 13/588,180

(22) Filed: Aug. 17, 2012

(65) Prior Publication Data

US 2013/0052016 A1 Feb. 28, 2013

(30) Foreign Application Priority Data

Aug. 26, 2011 (GB) .................................. 1114795.6

(51) Int. Cl.
| | |
|---|---|
| *B64C 11/06* | (2006.01) |
| *B64C 11/30* | (2006.01) |
| *F01D 1/26* | (2006.01) |
| *F02K 3/072* | (2006.01) |
| *F02C 9/58* | (2006.01) |
| *B64D 27/00* | (2006.01) |

(52) U.S. Cl.
CPC ................ *B64C 11/308* (2013.01); *F01D 1/26* (2013.01); *F02C 9/58* (2013.01); *F02K 3/072* (2013.01); *B64D 2027/005* (2013.01); *Y02T 50/66* (2013.01)

(58) Field of Classification Search
CPC .... B64C 11/308; B64C 11/306; B64C 11/38; B64C 11/385; B64C 11/40; B64C 11/42; B64C 11/48; F01D 1/26
See application file for complete search history.

(56) References Cited

U.S. PATENT DOCUMENTS

| 4,657,484 A | 4/1987 | Wakeman et al. |
| 4,772,181 A * | 9/1988 | Poucher .......................... 416/33 |
| 4,927,329 A | 5/1990 | Kliman et al. |

(Continued)

FOREIGN PATENT DOCUMENTS

| EP | 1881176 A2 | 6/2007 |
| EP | 2343238 A2 | 7/2011 |
| GB | 2186918 A | 8/1987 |
| WO | WO 2010108576 A2 * | 9/2010 |
| WO | 2010/130893 A1 | 11/2010 |

OTHER PUBLICATIONS

GB Search Report from corresponding GB Patent Application 1114795.6 Date as Dec. 13, 2011.

(Continued)

*Primary Examiner* — Dwayne J White
*Assistant Examiner* — Kayla McCaffrey
(74) *Attorney, Agent, or Firm* — GE Global Patent Operation; William S. Munnerlyn

(57) ABSTRACT

A pitch control mechanism for an open rotor gas turbine engine is provided, the engine having a first rotor assembly and a second rotor assembly, with a plurality of airfoil blades circumferentially mounted on each rotor assembly, and arranged in contra-rotational relationship to each other. The pitch control mechanism includes an actuator assembly configured to be secured to a non-rotating frame of the engine, the actuator assembly having a first actuator and a second actuator, with the actuator assembly being rotationally isolatable from and couplable to the first and second rotor assemblies such that, in use, an actuation signal from the first or second actuator induces a corresponding desired change in pitch of the airfoil blades of the respective first or second rotor assembly independently of the pitch of the airfoil blades of the second or first rotor assembly.

11 Claims, 7 Drawing Sheets

(56) References Cited

U.S. PATENT DOCUMENTS

| | | | |
|---|---|---|---|
| 5,282,719 A | | 2/1994 | McCarty et al. |
| 7,850,417 B2 * | | 12/2010 | Beaven .......................... 415/65 |
| 8,371,105 B2 * | | 2/2013 | Glynn et al. ................... 60/268 |
| 8,834,119 B2 * | | 9/2014 | Balk et al. ..................... 416/160 |
| 2008/0020891 A1 | | 1/2008 | Beaven |
| 2012/0294717 A1 * | | 11/2012 | Edwards ....................... 416/147 |

OTHER PUBLICATIONS

Adam McLoughlin, "Engine Powerplant Electrical Systems" MOET Project Consortium 2009.

Translated FR Preliminary Search Report issued on Feb. 23, 2016 in connection with corresponding FR Application 1257942.

* cited by examiner

PITCH CONTROL OF CONTRA-ROTATING AIRFOIL BLADES

BACKGROUND OF THE INVENTION

Embodiments of the subject matter disclosed herein relate to a mechanism for enabling independent pitch control of airfoil blades of contra-rotating rotor assemblies. The application is of particular benefit when applied to "open rotor" gas turbine engines.

Gas turbine engines employing an "open rotor" design architecture are known. The open rotor design is essentially a hybrid of conventional turbofan and turboprop gas turbine engines, but providing enhanced fuel efficiency over both conventional engine designs. A turbofan engine operates on the principle that a central gas turbine core drives a bypass fan, the fan being located at a radial location between a nacelle of the engine and the engine core. An open rotor engine instead operates on the principle of having the bypass fan located outside of the engine nacelle. This permits the use of larger fan blades able to act upon a larger volume of air than for a turbofan engine, and thereby helps to generate more thrust than for conventional engine designs. Optimum performance has been found with an open rotor design having a fan provided by two contra-rotating rotor assemblies, each rotor assembly carrying an array of airfoil blades located outside the engine nacelle. In appearance, the fan blades of an open rotor engine resemble the propeller blades of a conventional turboprop engine.

The use of contra-rotating rotor assemblies provides technical challenges in transmitting power from the turbine core to drive the airfoil blades of the respective two rotor assemblies in opposing directions.

EP1881176A2 (Rolls-Royce plc, 23 Jan. 2008) discloses an engine conforming to an open rotor design architecture, the engine having a mechanism for enabling independent pitch control of respective airfoil blades of a first rotor assembly and a second rotor assembly, where the first and second rotor assemblies are driven in a contra-rotating manner about a longitudinal axis of the engine.

Embodiments of the present invention seek to provide an improved alternative to the engine arrangement disclosed in EP1881176A2, and to provide improvements in efficiency over known designs.

BRIEF DESCRIPTION OF THE INVENTION

According to an embodiment of the present invention, a pitch control mechanism for an open rotor gas turbine engine is provided. The engine includes a first rotor assembly and a second rotor assembly, a plurality of airfoil blades circumferentially mounted on each rotor assembly and arranged in contra-rotational relationship to each other. The pitch control mechanism comprises an actuator assembly configured to be secured to a non-rotating frame of the engine, the actuator assembly comprising a first actuator and a second actuator, wherein the actuator assembly is rotationally isolatable from and couplable to the first and second rotor assemblies such that, in use, an actuation signal from the first or second actuator induces a corresponding desired change in pitch of the airfoil blades of the respective first or second rotor assembly independently of the pitch of the airfoil blades of the second or first rotor assembly.

According to another embodiment of the present invention, a turbine engine comprising a first rotor assembly and a second rotor assembly is provided. The first and second rotor assemblies each comprise a plurality of airfoil blades circumferentially mounted on each rotor assembly and arranged in contra-rotational relationship to each other, the pitch of the airfoil blades of the first rotor assembly and of the second rotor assembly being independently adjustable of each other. The engine further comprises an actuator assembly secured to a non-rotating frame of the engine. The actuator assembly comprising a first actuator and a second actuator, wherein the actuator assembly is rotationally isolated from and coupled to the first and second rotor assemblies such that, in use, an actuation signal from the first or second actuator induces a corresponding desired change in pitch of the airfoil blades of the respective first or second rotor assembly.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

Figure 1:
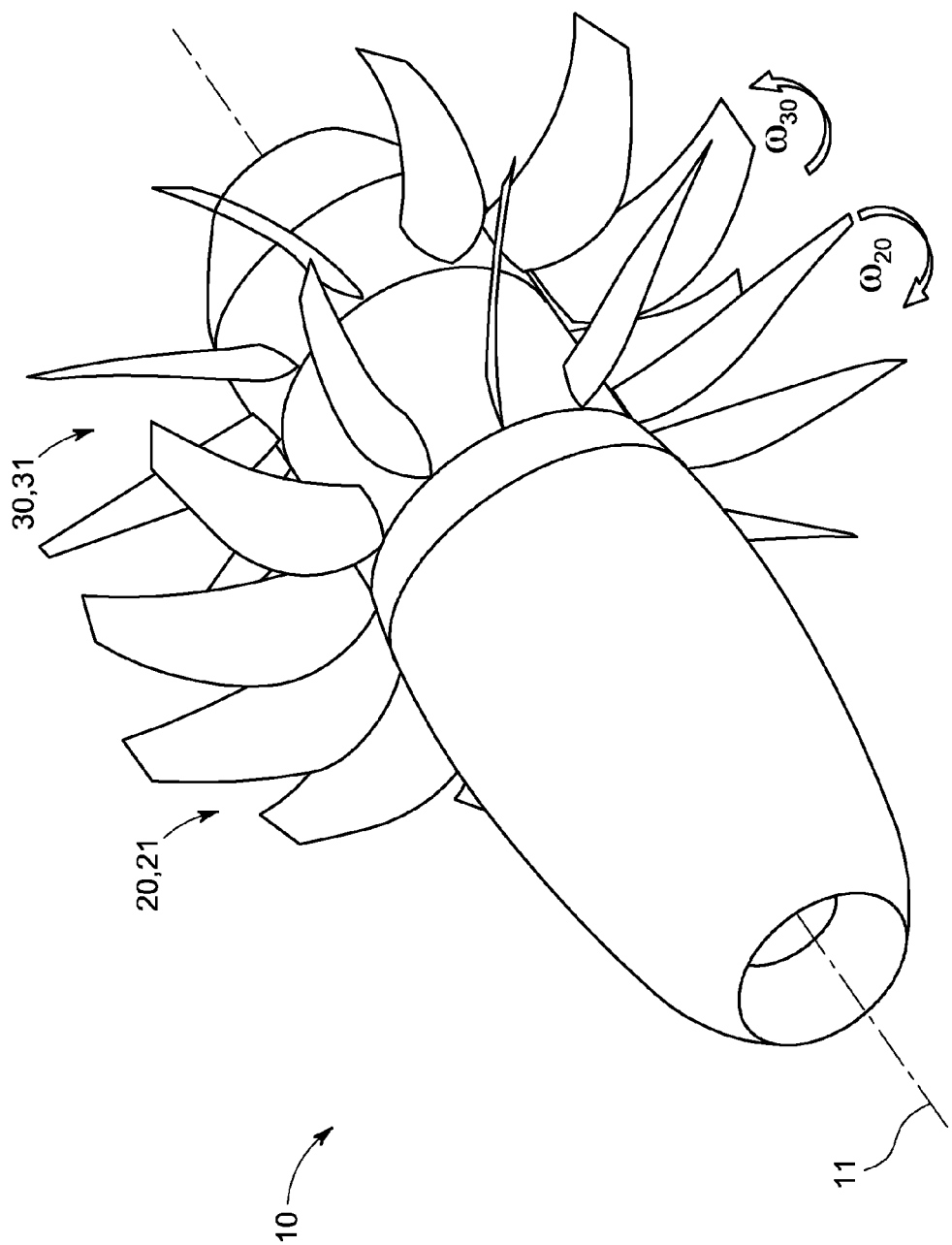
FIG. 1 shows a perspective view of an open rotor gas turbine engine.

As used herein, "contra-rotational relationship" means that the airfoil blades of the first and second rotor assemblies are arranged to rotate in opposing directions to each other. It is preferred that the airfoil blades of the first and second rotor assemblies are arranged to rotate about a common axis in opposing directions, and are axially spaced apart along that axis. For example, the respective airfoil blades of the first rotor assembly and second rotor assembly ma be co-axially mounted and spaced apart, with the blades of the first rotor assembly configured to rotate clockwise about the axis and the blades of the second rotor assembly configured to rotate counter-clockwise about the axis (or vice versa).

By ensuring that the actuator assembly is adapted to be secured to a non-rotating frame, embodiments of the present invention avoid the need for oil transfer bearings that would otherwise he needed if the actuator assembly were itself able to rotate relative to the frame. This feature enhances the reliability and minimizes the complexity of the lubrication system required for the engine and reducing potential leak pathways for oil, because it avoids the need for oil transfer bearings between the frame and the actuator assembly. This feature also enables increased oil pressures in the actuation assembly of the engine. Oil system pressures of the order of around 3000 psi are potentially feasible through applying embodiments of the present invention. This pressure is much higher than for assemblies that rely upon the use of oil transfer bearings. Further, this feature also allows for simple implementation of a blade position sensor. The blade position sensor can be located on the non-rotating frame (as part of the actuator assembly) and thereby avoids the need to transfer electric signals between rotating and non-rotating frames.

Rotational isolation and coupling of the actuator assembly to each of the first and second rotor assemblies may be enabled by use of one or more bearing arrangements. Conveniently, bearings are chosen Which are adapted to enable transfer of axial load. For example, angular contact bearings are particularly suitable for enabling efficient transfer of axial load.

The actuator assembly may he arranged such that the first and second actuators are concentrically mounted. Such an arrangement is known as a "double annular actuator". This arrangement of actuator assembly minimizes the volume required for the actuator assembly within a gas turbine engine—an environment where efficient use of space is essential. The actuator assembly may be a double annular actuator, with the first and second actuators coaxially mounted along or parallel to the central axis of the engine. The use of annular actuators reduces the number of actuators required within the engine and has the potential to enhance reliability and efficiency of the engine.

A first bearing arrangement may be associated with both of the first actuator and first rotor assembly, with a second bearing arrangement associated with both of the second actuator and second rotor assembly. The bearing arrangements may be adapted such that a displacement signal of the first or second actuator is transmittable via the respective first or second bearing arrangement to the respective first or second rotor assembly, the first and second bearing arrangements each being couplable to the airfoil blades of the respective first and second rotor assemblies such that, in use, the transmitted displacement signal is converted to a rotational output signal to thereby adjust the pitch of the airfoil blades of the respective first or second rotor assembly.

Conveniently, a first bearing is mounted relative to the first actuator such that a displacement signal of the first actuator acts upon an axial end face of the first bearing to thereby transmit a corresponding axial load to a first axially slideable annular vole rotatable with the first rotor assembly, the airfoil blades of the first rotor assembly mounted, to a plurality of radially extending shafts circumferentially disposed about the first yoke. The first bearing may be coupled to the airfoil blades of the first rotor assembly by means of a pin and roller arrangement. In one such pin and roller arrangement, a combination of a pin and a roller is associated with one or more of the radially extending shafts on which the airfoil blades of the first rotor assembly are mounted. Explaining further, the roller may be located in an annular groove provided on a surface of the first yoke, with the roller adapted to slide about the annular groove of the first yoke under the action of the transmitted axial load. The roller is offset from the longitudinal axis(es) of the associated one or more of the radially extending shafts, with the pin connecting each roller to the associated one or more of the radially extending shafts. In use, the transmitted axial load conveyed through the first bearing acts to induce an axial displacement of the first yoke relative to the first rotor assembly, thereby inducing the roller located therein to slide about the annular groove, the sliding of the roller acting upon the pin to twist the associated one or more of the radially extending shafts about their longitudinal axis (es) to thereby produce the desired change in pitch of the airfoil blades of the first rotor assembly. Each of the radially extending shafts may be associated with a respective combination of pin and roller.

A similar arrangement as outlined in the above paragraph may also or alternatively be provided for the second rotor assembly.

Contra-rotation of the airfoil blades of the first and second rotor assemblies is enabled by use of an epicyclic gearbox to transfer rotational drive to both of the first and second rotor assemblies, the first and second rotor assemblies being driven in opposing directions, the actuator assembly arranged to be spatially decoupled from the epicyclic gearbox. Spatially decoupled means that no part of the actuator assembly passes through the epicyclic gearbox. The epicyclic gearbox may take the form of a conventional planetary gearbox. In one embodiment of the invention, the planetary gearbox comprises a sun gear driven by the engine, planet gears associated with the first rotor assembly and a ring gear associated with the second rotor assembly, with the planet gears and ring gears enabling contra-rotation of the first and second rotor assemblies. Spatial decoupling of the actuator assembly from the epicyclic gearbox provides a potentially more reliable design of actuator assembly/pitch control mechanism/engine than for the known design described in EP1881176A2. The design of EP1881176A2 depends upon actuator rods of its actuator assembly for at least one of its two rotor assemblies passing through an epicyclic gearbox, either "through" or "between" planet gears as stated in paragraph 8 of EP1881176A2), and thereby increases both the complexity of the design for this known design and the number of potential failure modes.

FIG. 1 shows a perspective view of a typical open rotor gas turbine engine 10 for which the pitch control mechanism of embodiments of the present invention are particularly suitable. As is seen from FIG. 1, the engine 10 has a forward rotor assembly 20 on which is mounted an array of airfoil blades 21 and an aft rotor assembly 30 on which is mounted an array of airfoil blades 31, Both the forward and aft airfoil blades 21, 31 are each mounted for rotation about a central longitudinal axis 11 of the engine 10 in contra-rotational directions—indicated, by arrows $\omega_{20}$ and $\omega_{30}$ on FIG. 1.

Figure 2:
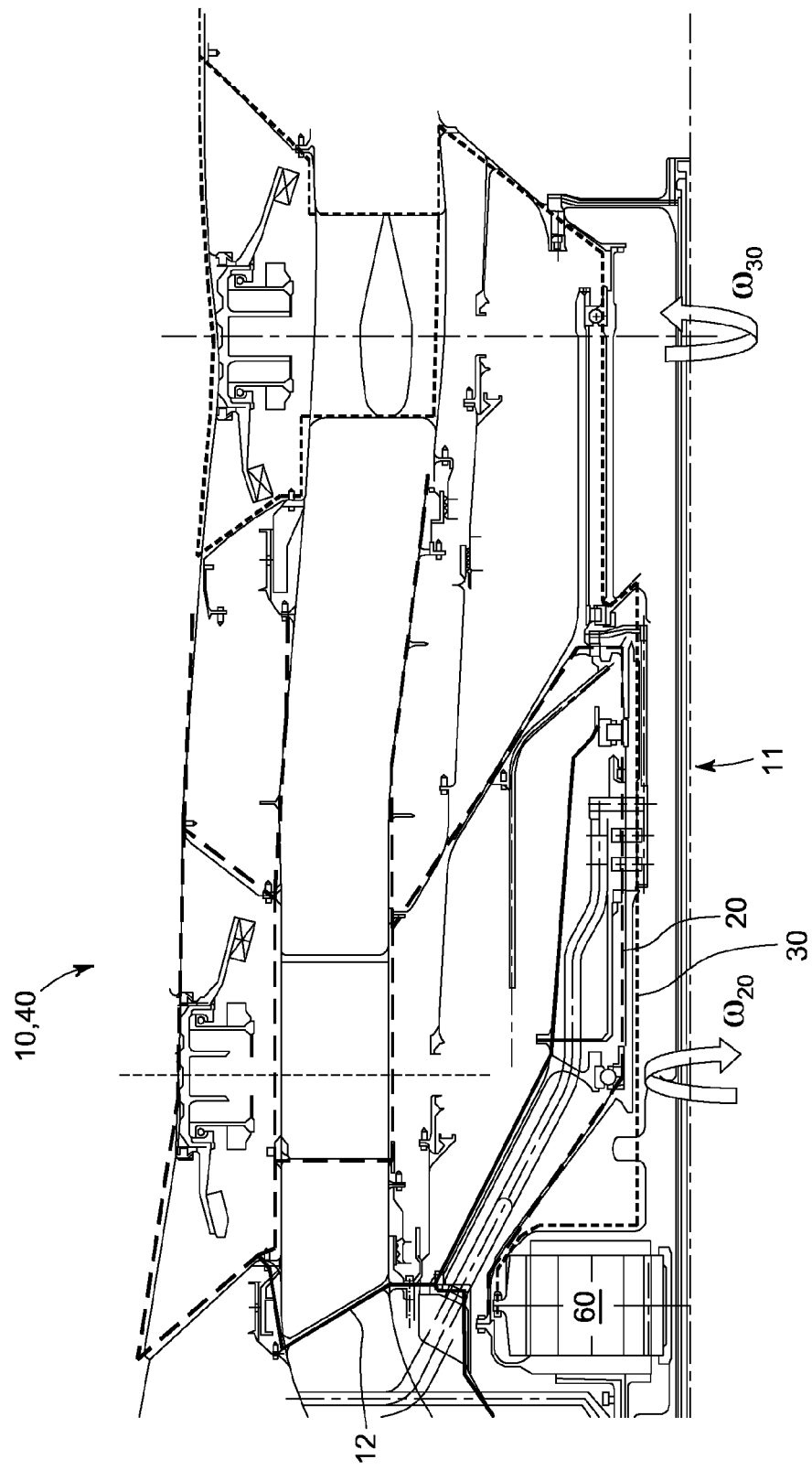
FIG. 2 shows a cross-sectional view of the engine of FIG. 1 incorporating a pitch control mechanism according to an embodiment of the invention. This figure shows the general disposition of the frames of a forward rotor assembly and an aft rotor assembly, and a non-rotating frame of the engine.
Figure 3:
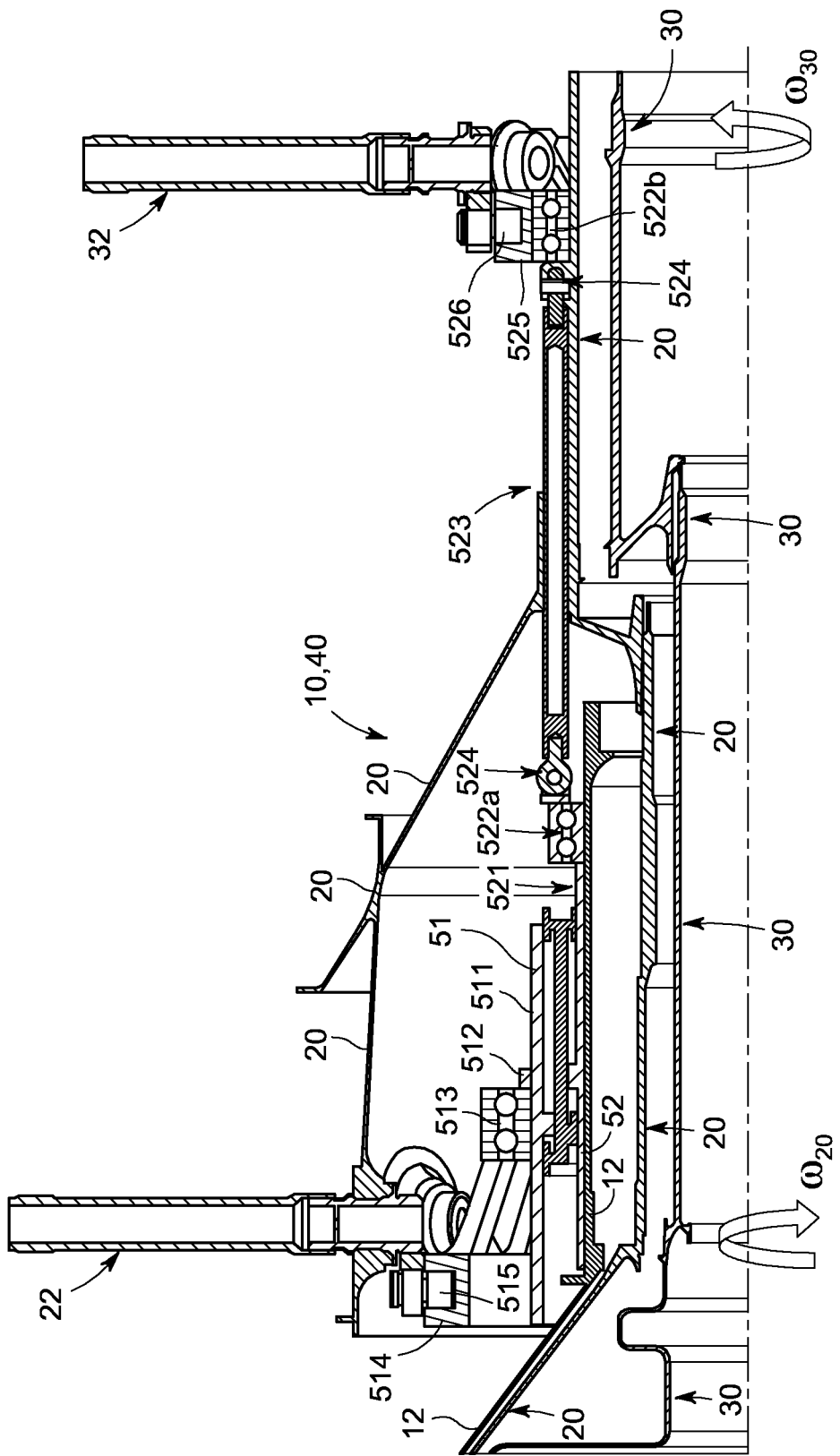
FIG. 3 shows a detailed sectional view of the engine and pitch control mechanism shown in FIG. 2.

The sectional view of FIG. 3 shows that the engine 10 has a pitch control mechanism 40 having an actuator assembly 50. The actuator assembly 50 is shown more clearly on FIG. 4 (bounded by a dotted oval line). The actuator assembly is secured to a static non-rotating frame 12 of the engine 10. The frame 12 is secured (by means not shown) to the external casing or nacelle of the engine 10. FIG. 2 shows the general boundaries of the static non-rotating frame 12, the forward rotor assembly 20 and the aft rotor assembly 30. The respective directions of rotation $\omega_{20}$, $\omega_{30}$ are also marked up for the airfoil blades 21, 31 of the forward and aft rotor assemblies 20, 30.

A planetary gearbox 60 is incorporated within the engine 10 to transfer rotational drive to both of the forward and aft rotor assemblies 20, 30 (see FIG. 2). The component parts of the planetary gearbox 60 are not shown in the figures.

Figure 4:
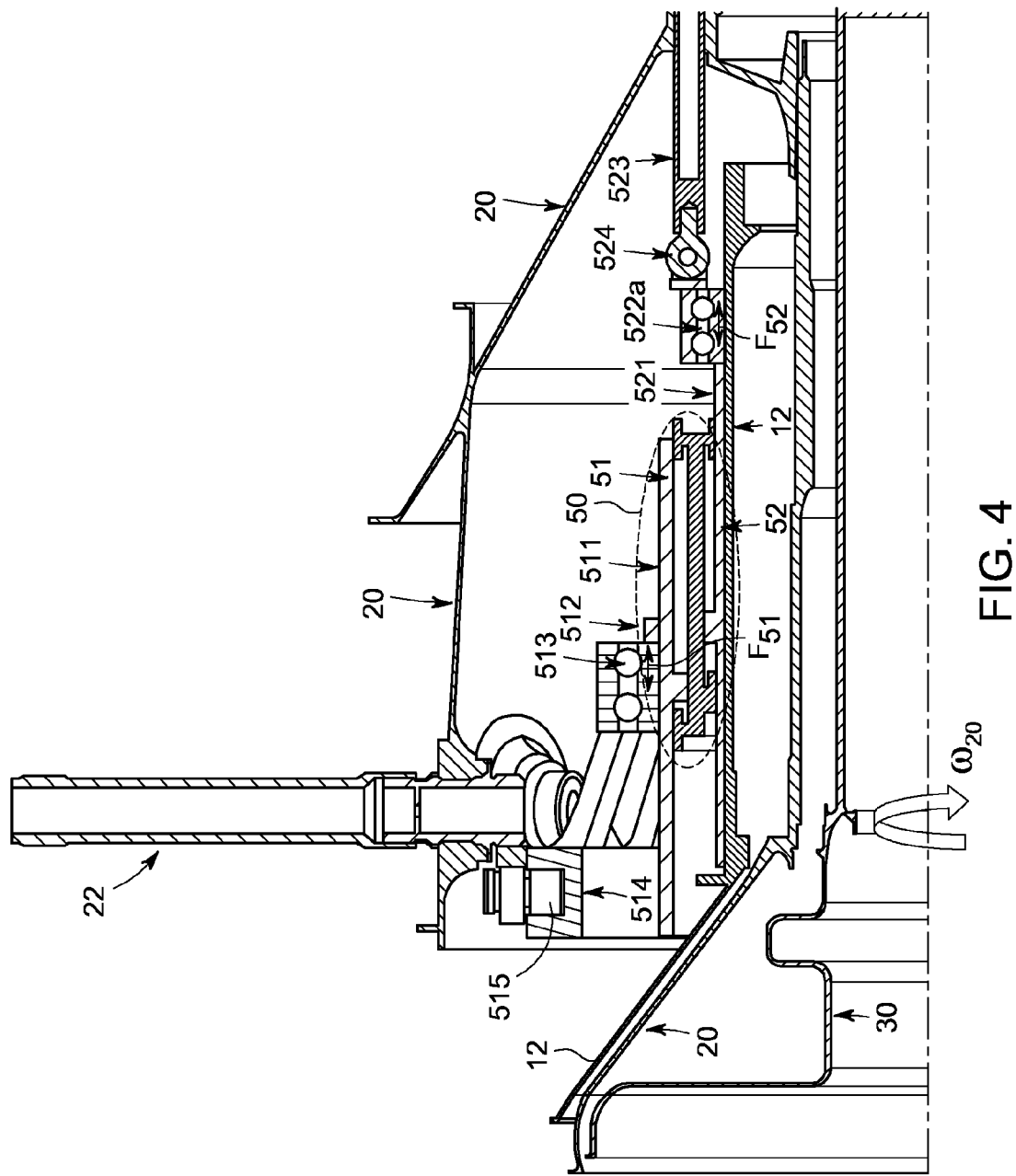
FIG. 4 shows a detailed sectional view of the forward rotor assembly of FIGS. 2 and 3.

The actuator assembly 50 is a double annular hydraulic, actuator having a forward actuator 51 and an aft actuator 52 concentrically mounted relative to each other and about the longitudinal engine axis 11 (as more clearly shown in FIG. 4). The forward actuator 51 is coupled to the forward rotor assembly 20, with the aft actuator 52 coupled to the aft rotor assembly 30. The construction of the forward actuator/rotor assembly and related parts will be described separately from that of the aft actuator/rotor assembly and related parts.

Figure 7:
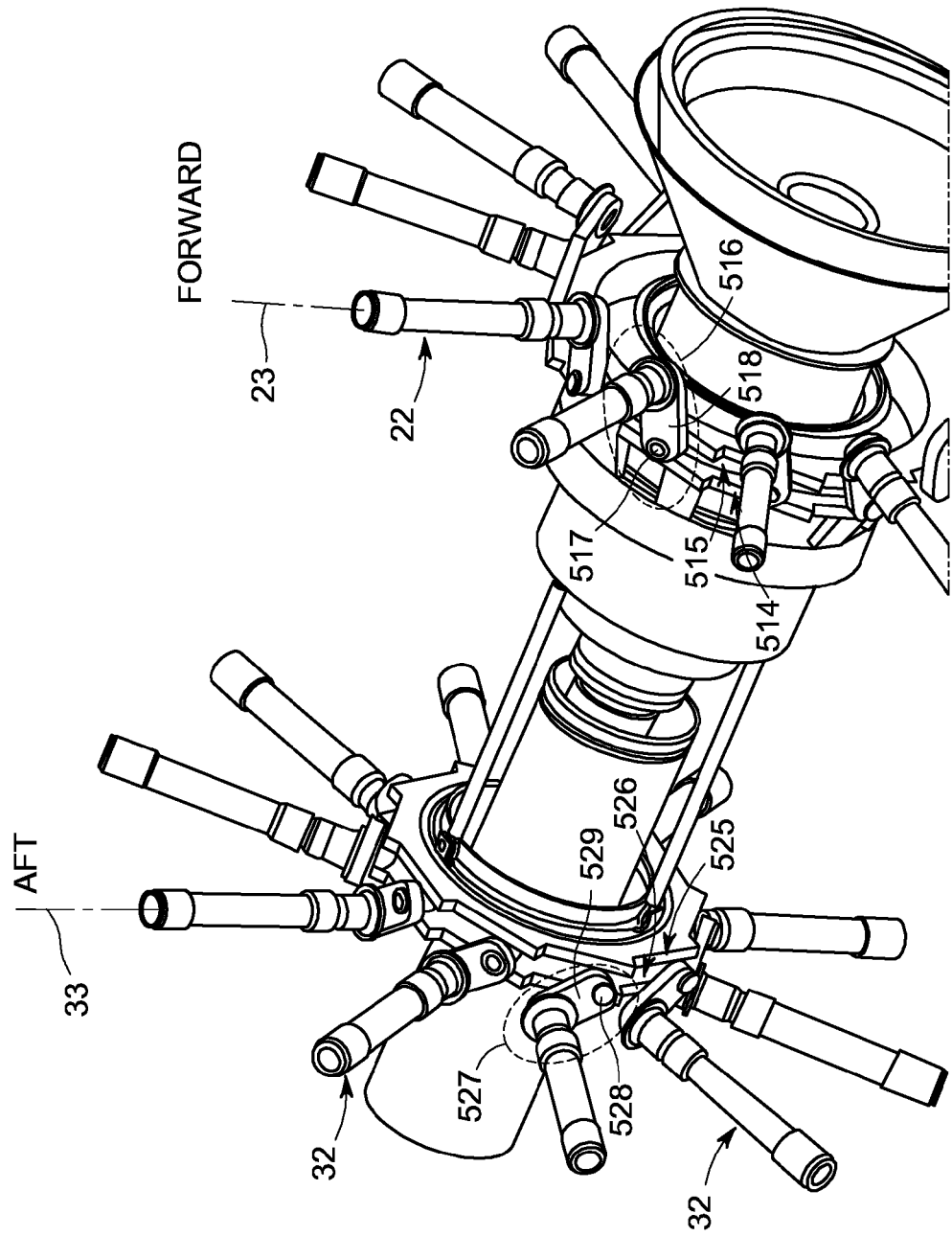
FIG. 7 shows a detailed perspective view of both the forward and aft rotor assemblies shown in FIGS. 4, 5 and 6.

As shown in FIGS. 3 and 4, the forward actuator 51 has a piston 511 capable of sliding to and fro parallel to engine axis 11. An annular flange 512 extends outwardly from the outer wail of the piston 511. The flange 512 abuts against the inside race of a transfer bearing 513, the bearing concentrically mounted about the forward actuator 51. The outside race of the transfer bearing 513 is connected to a yoke 514, the yoke mounted to and rotatable with the forward rotor assembly 20. As shown in FIGS. 4 and 7, the yoke 514 has an annular groove 515 provided in its radially outer facing surface. The forward array of airfoil blades 21 are mounted to the forward rotor assembly 20 as described in the following paragraph.

As shown in FIGS. 4 and 7, a plurality of radially extending shafts 22 are located about the forward rotor assembly 20, with a single one of the airfoil blades 21 mounted to each shaft (by means not shown). The shafts 22 are coupled to the yoke 514 by a pin and roller arrangement 516 (shown most clearly in FIG. 7). The pin and roller arrangement 516 has a cylindrical shaped roller 517 located in the annular groove 515 of the yoke 514, with a pin 518 in turn connecting the roller 517 to one of the radially extending shafts 22. Each of the shafts 22 is coupled to the yoke, 514 by its own combination of pin and roller.

In use, an actuation signal from the forward actuator 51 of the actuator assembly 50 acts to axially displace piston 511 parallel to engine axis 11. In so doing, the annular flange 512 of the piston 511 acts upon the inside race of the transfer hearing 513 with axial load $F_{51}$ (see FIG. 4). By was of example only, the axial load $F_{51}$ may be of the order 75 klbf. The axial load $F_{51}$ is transferred to the yoke 514 via the outside race of the transfer bearing 513 and thereby urges the yoke to slide parallel to the engine axis 11. This axial sliding of the yoke 514 causes each of the rollers 517 to circumferentially slide about the annular groove 515 of the yoke 514. with the pin 518 in turn acting to twist its respective radially extending shaft 22 about the longitudinal axis 23 of the shaft (see FIG. 7), to thereby adjust the pitch of the airfoil blade 21 mounted thereto.

In this manner, the forward actuator 51 is coupled to the forward rotor assembly 20, resulting in the axial displacement and, the induced axial load $F_{51}$ the forward actuator 51 being converted into a rotational output signal to adjust the pitch of the blades 21 of the forward rotor assembly.

Figure 5:
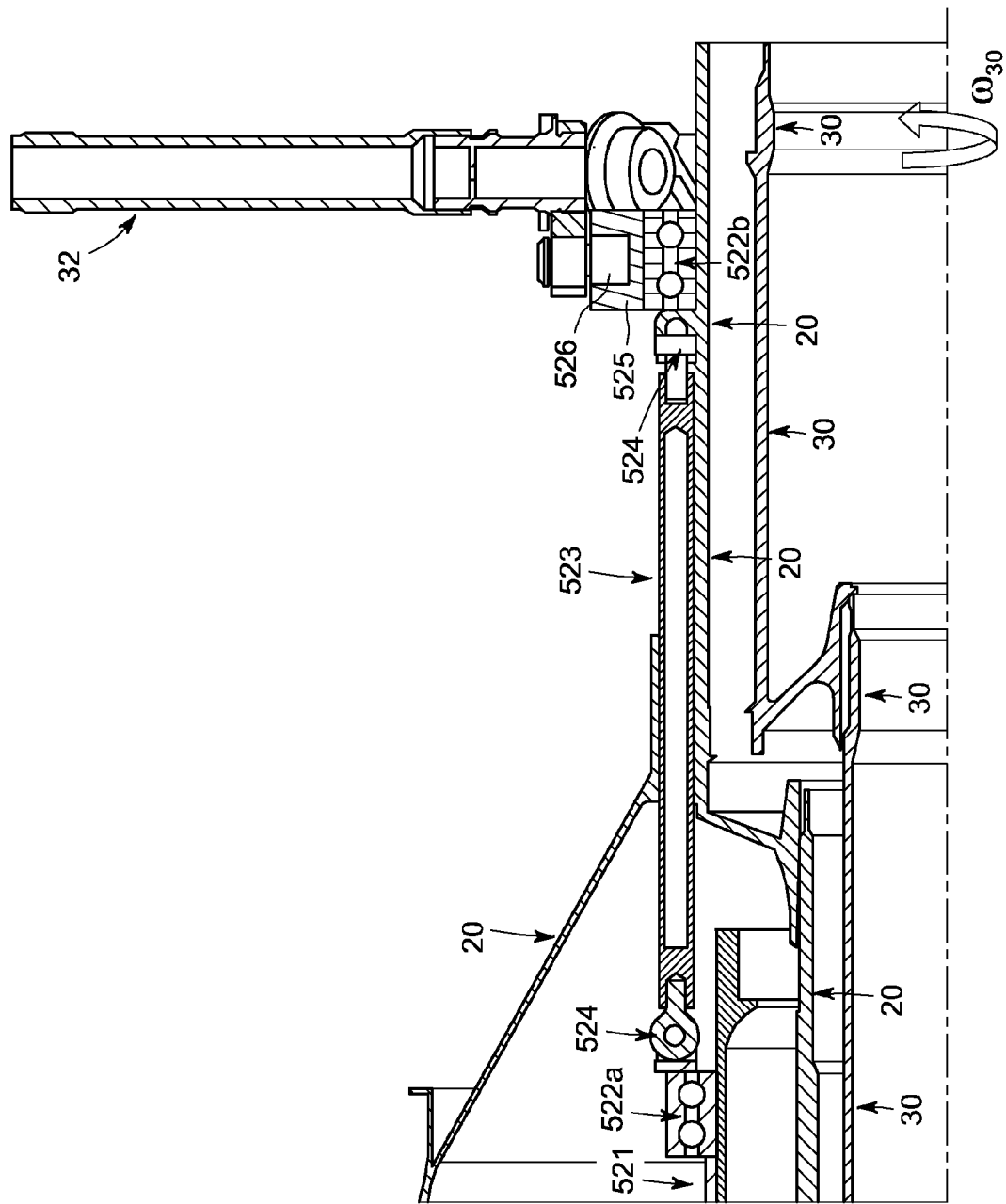
FIG. 5 shows a detailed sectional view of the aft rotor assembly of FIGS. 2 and 3.

As shown in FIGS. 3, 4 and 5, the aft actuator 52 has a piston 521 capable of sliding to and fro parallel to engine axis 11. An annular end face of the piston 521 abuts against the inside race of a transfer bearing 522a the bearing concentrically mounted about the static non-rotating frame 12. Axially extending transfer rods 523 extend between the outside race of transfer bearing 522a and the inside race of a further transfer bearing 522b (see FIGS. 3 and 5). Spherical bearings 524 are incorporated at either end of the transfer rods 523 at the interface with the transfer bearings 522a,b.

A yoke 525 is mounted about the outside race of the transfer bearing 522b, the yoke rotatable with the all rotor assembly 30. As more clearly shown in FIG. 5, the yoke 525 has an annular groove 526 provided in its radially outer facing surface. The aft array of airfoil blades 31 are mounted to the aft rotor assembly 30 as described in the following paragraph.

Figure 6:
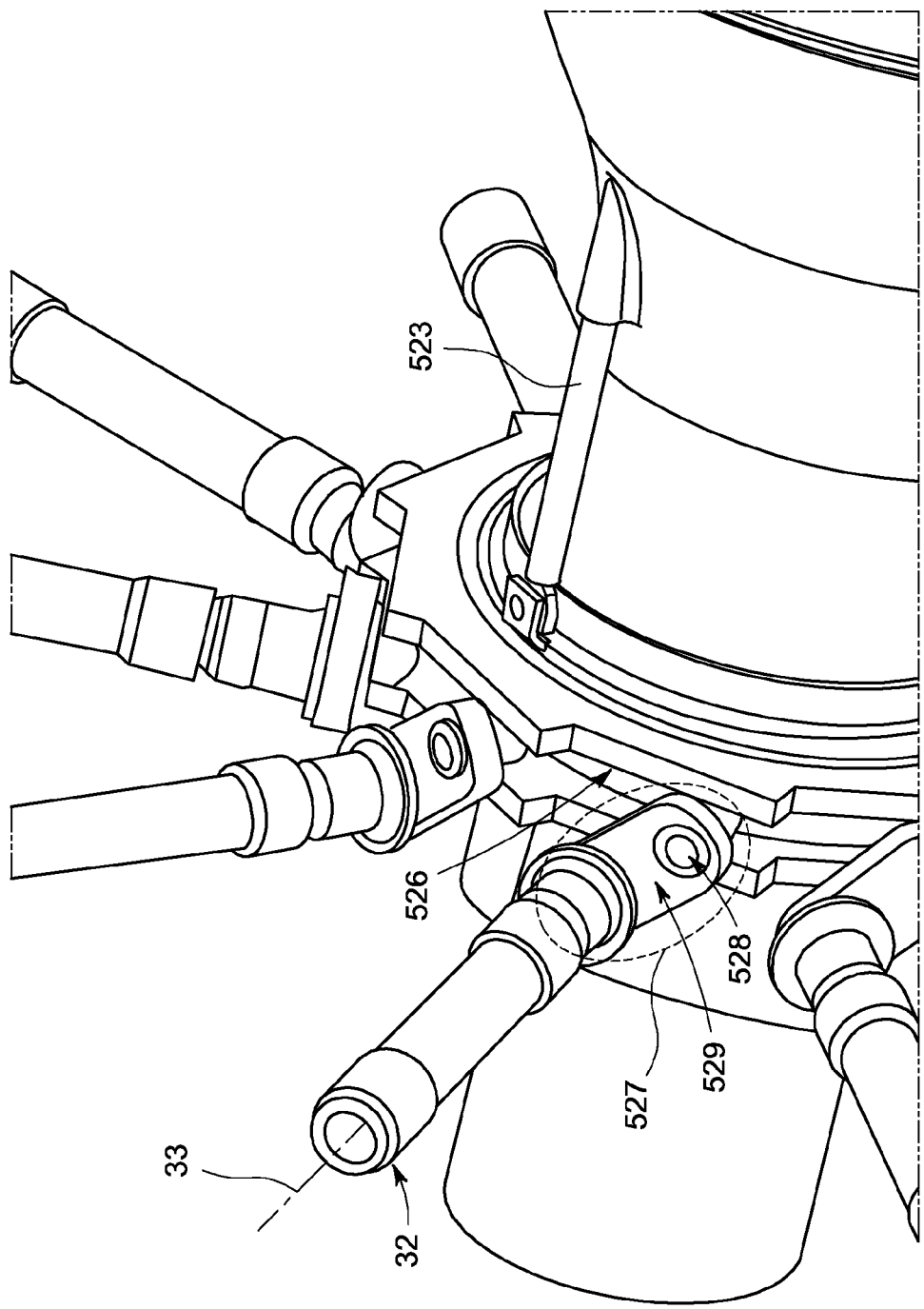
FIG. 6 shows a detailed perspective view of the aft rotor assembly shown in FIG. 5.

A plurality of radially extending shafts 32 are located about the aft rotor assembly 30, with a single one of the airfoil blades 31 mounted to each shaft (by means not shown). The shafts 32 are coupled to the yoke 525 by a pin and roller arrangement 527 (shown most clearly in FIG. 6). The pin and roller arrangement 527 has a cylindrical shaped roller 528 located in the annular groove 526 of the yoke 525, with a pin 529 in turn connecting the roller 528 to one of the radially extending shafts 32. Each of the shafts 32 is coupled to the yoke 525 by its own combination of pin and roller.

In use, an actuation signal from the aft actuator 52 of the actuator assembly 50 acts to axially displace piston 521 along engine axis 11. In so doing, the annular end face of the piston 521 acts upon the inside race of the transfer bearing 522a with axial load $F_{52}$ (see FIGS. 3 and 5). By way of example only, the axial load $F_{52}$ may be of the order 55 klbf. The axial load $F_{52}$ is transmitted from the outside race of the transfer bearing 522a, via the axially extending transfer rods 523, to the outside race of the transfer hearing 522b and thereby to the yoke 525. The axial load $F_{52}$ thereby urges the transfer bearing 522b and the yoke 525 to slide parallel to the engine axis 11. This axial sliding of the yoke 525 causes each of the rollers 528 to circumferentially slide about the annular groove 526 of the yoke 525, with the pin 529 in turn acting to twist its respective radially extending shaft 32 about the longitudinal axis 33 of the shaft (see FIGS. 6 and 7), to thereby adjust the pitch of the airfoil blade 31 mounted thereto.

In this manner, the aft actuator 52 is coupled to the aft rotor assembly 30, resulting in the axial displacement and the induced axial load $F_{52}$ of the aft actuator 52 being converted into a rotational output signal to adjust the pitch of the blades 31 of the forward rotor assembly.

The transfer bearings 513 and 522a,b ensure that each of the first and second actuators 51, 52 are rotationally isolated from but coupled to the first and second rotor assemblies 20, 30 respectively. In one embodiment, the transfer bearings may be angular contact bearings because these are particularly good at transferring axial loads. However, other known bearing types may be used which are suitable for enabling the transfer of axial load.

For the pin and roller arrangement outlined above, the amount by which the pitch of the airfoil blades 21, 31 is adjusted will be dependent upon the magnitude of the axial displacement of the respective actuator 51, 52.

For the engine 10 shown in the figures and described above, the actuator assembly 50 is arranged to be spatially decoupled from the planetary gearbox 60.

The foregoing description of the embodiments of the invention is provided for illustrative purposes only and is not intended to limit the scope of the invention as defined in the appended claims.

What is claimed is:

1. A pitch control mechanism for an open rotor gas turbine engine, the engine comprising a first rotor assembly and a second rotor assembly, a plurality of airfoil blades circumferentially mounted on each rotor assembly and arranged in contra-rotational relationship to each other, the pitch control mechanism comprising:
    an actuator assembly configured to be secured to a non-rotating frame of the engine, the actuator assembly comprising a first actuator and a second actuator, wherein the actuator assembly is rotationally isolated from and coupled to the first and second rotor assemblies such that, in use, an actuation signal from the first or second actuator induces a corresponding desired change in pitch of the airfoil blades of the respective first or second rotor assembly independently of the pitch of the airfoil blades of the second or first rotor assembly, wherein the first and second actuators are concentrically mounted, and the actuator assembly is configured to be spatially decoupled from a gearbox configured to transfer rotational drive to either or both of the first and second rotor assemblies.

2. The pitch control mechanism according to claim 1, wherein the pitch control mechanism further comprises one or more bearing arrangements configured to rotationally isolate and couple the actuator assembly to the first and second rotor assemblies.

3. The pitch control mechanism according to claim 2, wherein the one or more bearing arrangements comprises a first bearing arrangement and a second bearing arrangement, the first bearing arrangement being associated with both of the first actuator and the first rotor assembly, and the second bearing arrangement being associated with both of the second actuator and the second rotor assembly, the first and second bearing arrangements being configured such that a displacement signal of the first or second actuator is transmittable via the respective first or second bearing arrangement to the respective first or second rotor assembly, the first and second bearing arrangements each being couplable to the airfoil blades of the respective first or second rotor assembly such that, in use, the transmitted displacement signal is converted to a rotational output signal to thereby adjust the pitch of the airfoil blades of the respective first or second rotor assembly.

4. A turbine engine comprising:
   a first rotor assembly and a second rotor assembly, the first and second rotor assemblies each comprising a plurality of airfoil blades circumferentially mounted on each rotor assembly and arranged in contra-rotational relationship to each other, the pitch of the airfoil blades of the first rotor assembly and of the second rotor assembly being independently adjustable of each other; and
   an actuator assembly secured to a non-rotating frame of the engine, the actuator assembly comprising a first actuator and a second actuator, wherein the actuator assembly is rotationally isolated from and coupled to the first and second rotor assemblies such that, in use, an actuation signal from the first or second actuator induces a corresponding desired change in pitch of the airfoil blades of the respective first or second rotor assembly, wherein the first and second actuators are concentrically mounted and, the actuator assembly is configured to be spatially decoupled from a gearbox configured to transfer rotational drive to either or both of the first and second rotor assemblies.

5. The engine according to claim 4, wherein the engine further comprises one or more bearing arrangements configured to rotationally isolate and couple the actuator assembly to the first and second rotor assemblies.

6. The engine according to claim 5, wherein the one or more bearing arrangements comprises a first bearing arrangement and a second bearing arrangement, the first bearing arrangement being associated with the first actuator and the first rotor assembly, and the second bearing arrangement being associated with the second actuator and the second rotor assembly, the first and second bearing arrangements being configured such that a displacement signal of the first or second actuator is transmittable via the respective first or second bearing arrangement to the respective first or second rotor assembly, the first and second bearing arrangements each being coupled to the airfoil blades of the respective first and second rotor assembly such that, in use, the transmitted displacement signal is converted to a rotational output signal to thereby adjust the pitch of the airfoil blades of the respective first or second rotor assembly.

7. The engine according to claim 6, further comprising a pin and roller arrangement for the coupling of the first or second bearing arrangement with the airfoil blades of the respective first or second rotor assembly.

8. The engine according to claim 7, wherein either or both of the first or second bearing arrangements comprises a bearing mounted relative to the respective first or second actuator such that a displacement signal of the first or second actuator acts upon an axial end face of the bearing to thereby transmit a corresponding axial load to an axially slideable annular yoke rotatable with the respective first or second rotor assembly, the airfoil blades of the respective first or second rotor assembly being mounted to a plurality of radially extending shafts circumferentially disposed about the yoke, the pin and roller arrangement comprising:
   a combination of a pin and a roller associated with one or more of the radially extending shafts,
   wherein the roller is located in an annular groove provided on a surface of the yoke wherein the roller is configured to slide about the annular groove of the yoke under the action of the transmitted axial load, wherein the roller is offset from a longitudinal axis of the associated one or more radially extending shafts, and
   wherein the pin connects each roller to the associated one or more radially extending shafts such that sliding of the roller about the annular groove of the yoke acts upon the pin to twist the associated one or more radially extending shafts and thereby adjust the pitch of the airfoil blades of the respective first or second rotor assembly.

9. The engine according to claim 8, wherein each shaft of the plurality of radially extending shafts is associated to a respective combination of pin and roller.

10. The engine according to claim 9, wherein the actuator assembly is mounted along or parallel to a longitudinal axis of the engine.

11. The engine according to claim 4, wherein the gearbox is an epicyclic gearbox for transferring rotational drive to both of the first and second rotor assemblies, the first and second rotor assemblies being driven in opposing directions, the actuator assembly arranged to be spatially decoupled from the epicyclic gearbox.

* * * * *